(12) United States Patent
Jung et al.

(10) Patent No.: US 12,177,044 B2
(45) Date of Patent: Dec. 24, 2024

(54) DATA RECEIVING DEVICE

(71) Applicant: SAMSUNG ELECTRONICS CO., LTD., Suwon-si (KR)

(72) Inventors: Jin Ook Jung, Suwon-si (KR); Jae Woo Park, Suwon-si (KR); Myoung Bo Kwak, Suwon-si (KR); Young Min Ku, Suwon-si (KR); Kyoung Jun Roh, Suwon-si (KR); Jung Hwan Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/134,141

(22) Filed: Apr. 13, 2023

(65) Prior Publication Data

US 2024/0080228 A1  Mar. 7, 2024

(30) Foreign Application Priority Data

Sep. 6, 2022 (KR) .................. 10-2022-0113003

(51) Int. Cl.
*H03H 7/30* (2006.01)
*H04L 25/03* (2006.01)

(52) U.S. Cl.
CPC .............................. *H04L 25/03006* (2013.01)

(58) Field of Classification Search
CPC ................................................ H04L 25/03006
USPC ................................. 375/230, 219, 295, 316
See application file for complete search history.

(56) References Cited

U.S. PATENT DOCUMENTS

| 8,611,403 | B1 | 12/2013 | Ding |
| 8,611,411 | B2 | 12/2013 | Hayami et al. |
| 9,288,087 | B1 | 3/2016 | Shin et al. |
| 10,659,260 | B2 | 5/2020 | Hu et al. |
| 11,177,894 | B2 | 11/2021 | Simpson |
| 11,212,143 | B1 | 12/2021 | Bailey et al. |
| 11,240,075 | B2 | 2/2022 | Palusa et al. |
| 2005/0286624 | A1 | 12/2005 | Park |
| 2008/0144708 | A1 | 6/2008 | Tsule et al. |
| 2022/0149898 | A1* | 5/2022 | Kuriyama ............ H04B 7/0413 |

FOREIGN PATENT DOCUMENTS

| JP | 2012-151808 A | 8/2012 |
| JP | 2021-150676 A | 9/2021 |
| KR | 10-2017-0081518 A | 7/2017 |

* cited by examiner

Primary Examiner — Zewdu A Kassa
(74) Attorney, Agent, or Firm — Muir Patent Law, PLLC

(57) ABSTRACT

A data receiving device may include a dummy stage block. The dummy stage block may include m dummy stages, wherein m is a natural number greater than or equal to two. Each of the m dummy stages may be configured to remove inter-symbol interference (ISI) from a dummy input signal using dummy coefficient information to generate a dummy output signal free of the ISI. Each of the m dummy stages may be further configured to output the dummy output signal. A normal stage block may include n normal stages, wherein n is a natural number greater than or equal to two. Each of the n normal stages may be configured to remove ISI from an input signal using coefficient information to generate an output signal free of the ISI and may be further configured to output the output signal.

20 Claims, 14 Drawing Sheets

244

DATA RECEIVING DEVICE

CROSS-REFERENCE TO RELATED APPLICATION

Korean Patent Application No. 10-2022-0113003, filed on Sep. 6, 2022, in the Korean Intellectual Property Office, is incorporated by reference herein in its entirety.

BACKGROUND

1. Field

Embodiments relate to a data receiving device.

2. Description of the Related Art

Inter-symbol Interference (ISI) contained in a received signal (or received data) in a communication channel may decrease the reliability of the received signal. In order to increase reliability of a received signal, an equalizer with a low Bit Error Rate (BER) is required.

SUMMARY

Embodiments are directed to a data receiving device. The data receiving device may include a dummy stage block including m dummy stages, where m is a natural number greater than or equal to two. Each of the m dummy stages may remove ISI from a dummy input signal using dummy coefficient information to generate a dummy output signal free of the ISI and outputs the dummy output signal. The data receiving device may further include a normal stage block including n normal stages, where n is a natural number greater than or equal to two. Each of the n normal stages may remove ISI from an input signal using coefficient information to generate an output signal free of the ISI and outputs the output signal. One of the n normal stages may receive the coefficient information from the dummy stage block. The dummy stage block may enable some of the m dummy stages and disables the remaining dummy stages, based on the dummy output signal.

Embodiments are also directed to a data receiving device. The data receiving device may include a first dummy stage configured to receive a first dummy input signal, remove ISI from the first dummy input signal using first dummy coefficient information to generate a first dummy output signal free of the ISI, output the first dummy output signal, generate second dummy coefficient information based on the first dummy output signal, and output the second dummy coefficient information. The data receiving device may further include a second dummy stage configured to receive a second dummy input signal, receive the second dummy coefficient information from the first dummy stage, remove ISI from the second dummy input signal using the second dummy coefficient information to generate a second dummy output signal free of the ISI, output the second dummy output signal, generate third dummy coefficient information based on the second dummy output signal, and output the third dummy coefficient information. The data receiving device may further include a multiplexer configured to select one of the second dummy coefficient information and the third dummy coefficient information, based on a select signal, and to output the selected one of the second dummy coefficient information and the third dummy coefficient information. The data receiving device may further include a first normal stage configured to receive a first input signal, receive first coefficient information from the multiplexer, remove ISI from the first input signal using the first coefficient information to generate a first output signal free of the ISI, output the first output signal, generate second coefficient information based on the first output signal, and output the second coefficient information. The data receiving device may further include a second normal stage configured to receive a second input signal, receive the second coefficient information from the first normal stage, remove ISI from the second input signal using the second coefficient information to generate a second output signal free of the ISI, output the second output signal, generate third coefficient information based on the second output signal and output the third coefficient information.

Embodiments are also directed to a data receiving device. The data receiving device may include a first dummy stage configured to receive a first dummy input signal, remove ISI from the first dummy input signal using first dummy coefficient information to generate a first dummy output signal free of the ISI, output the first dummy output signal, generate second dummy coefficient information based on the first dummy output signal, and output the second dummy coefficient information. The data receiving device may further include a second dummy stage configured to receive a second dummy input signal, receive the second dummy coefficient information from the first dummy stage, remove ISI from the second dummy input signal using the second dummy coefficient information to generate a second dummy output signal free of the ISI, output the second dummy output signal, generate third dummy coefficient information based on the second dummy output signal, and output the third dummy coefficient information. The data receiving device may further include a first normal stage configured to receive a first input signal, receive the second dummy coefficient information from the first dummy stage, remove ISI from the first input signal using the second dummy coefficient information to generate a first output signal free of the ISI, output the first output signal, generate first coefficient information based on the first output signal, and output the first coefficient information. The data receiving device may further include a second normal stage configured to receive a second input signal, receive the first coefficient information from the first normal stage, remove ISI from the second input signal using the first coefficient information to generate a second output signal free of the ISI, output the second output signal, generate second coefficient information based on the second output signal, and output the second coefficient information.

BRIEF DESCRIPTION OF DRAWINGS

Features will become apparent to those of skill in the art by describing in detail example embodiments with reference to the attached drawings, in which.

DETAILED DESCRIPTION

Figure 1:
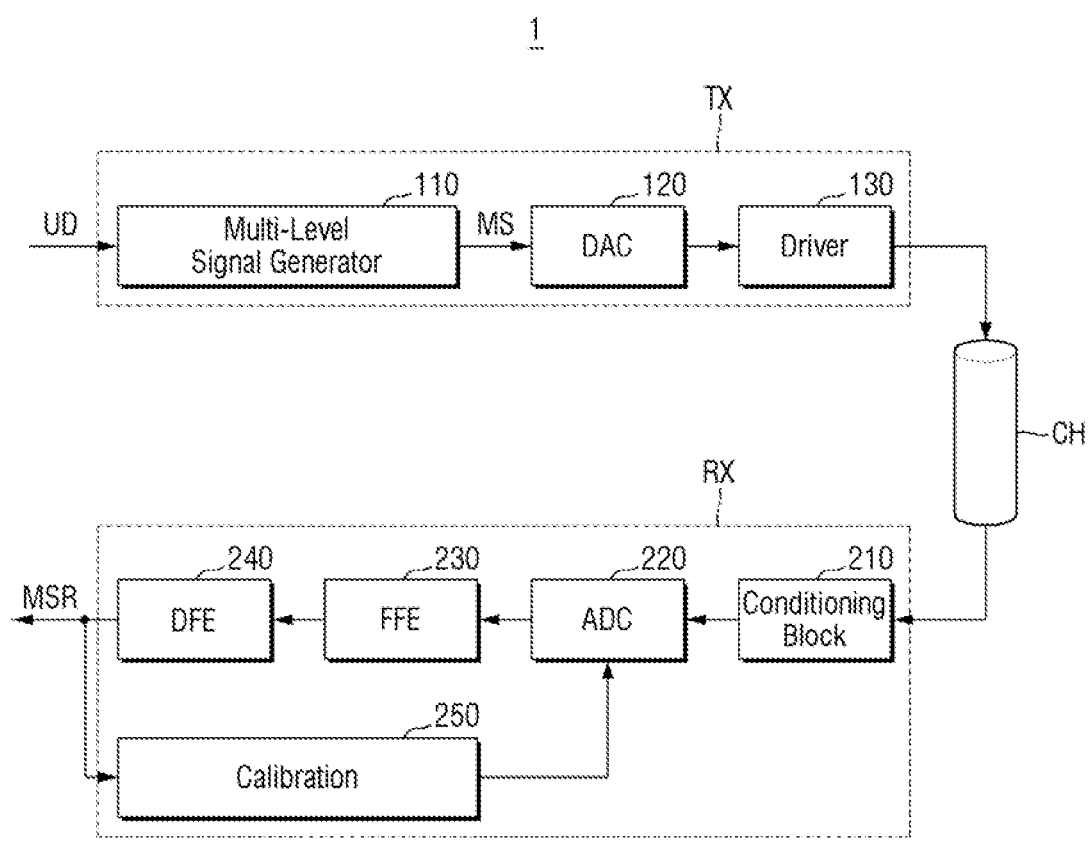
FIG. 1 is a block diagram illustrating a data transmitting/receiving system according to example embodiments.
Figure 2:
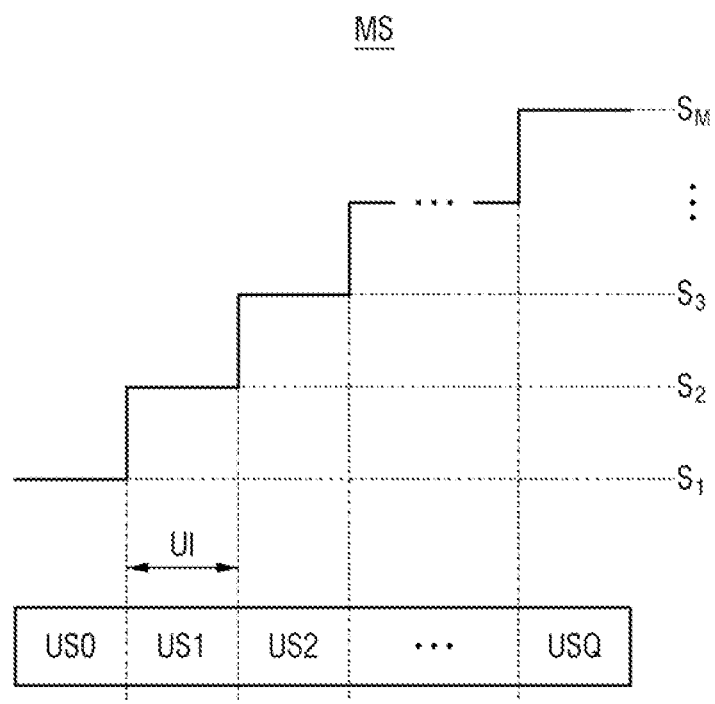
FIG. 2 is a diagram for illustrating an example embodiment of a multi-level signal generated by a multi-level signal generator 110 shown in FIG. 1.

FIG. 1 is a block diagram of a data transmitting/receiving system according to example embodiments. FIG. 2 is a diagram for illustrating a multi-level signal generated by a multi-level signal generator shown in FIG. 1.

Referring to FIG. 1, a data transmitting/receiving system 1 may include a data transmitting device TX and a data receiving device RX. The data transmitting device TX may generate a multi-level signal MS from a user data UD in a form of a digital signal. Then, the data transmitting device TX may convert the multi-level signal MS into an analog signal and transmit the analog signal to the data receiving device RX via a channel CH.

The data transmitting device TX may include a multi-level signal generator 110, a digital-to-analog converter 120 and a driver 130. In some embodiments, the data transmitting device TX may include further components. The multi-level signal generator 110 may generate the multi-level signal MS from the user data UD in a form of the digital signal.

Referring to FIG. 2, the multi-level signal MS may include a plurality of unit symbols US0 to USQ that are consecutively arranged. Each of the unit symbols US0 to USQ is maintained for a unit interval UI. In this embodiment, each of the unit symbols US0 to USQ may have one signal level among M signal levels S1 to SM (M is a natural number of 2 or larger). In an implementation, the multi-level signal MS may include a unit symbol US0 having a signal level S1, a unit symbol US1 having a signal level S3 subsequent to the unit symbol US0, and a signal level SM having a unit symbol US2 subsequent to the unit symbol US1.

Further, in some embodiments, the multi-level signal MS may include a unit symbol US0 having a signal level S2, a unit symbol US1 having a signal level S1 subsequent to the unit symbol US0, a unit symbol US2 having a signal level SM subsequent to the unit symbol US1, and a unit symbol US3 having a signal level S1 subsequent to the unit symbol US2. In an implementation, the multi-level signal MS may be defined as a set of consecutive unit symbols US0 to USQ, each having one of the M signal levels S1 to SM. In some embodiments, the multi-level signal MS may be a Pulse Amplitude Modulation 4-level (PAM4) ( ) signal in which a value of M is 4. However, embodiments are not limited thereto.

Referring back to FIG. 1, the digital-to-analog converter 120 may convert the multi-level signal MS into the analog signal. The driver 130 may perform tasks necessary to transmit the analog signal from the digital-to-analog converter 120 to the data receiving device RX through the channel CH. In some embodiments, the driver 130 may transmit data in a form of a serial signal.

The analog signal transmitted from the data transmitting device TX may be transmitted to the data receiving device RX through the channel CH. The signal transmitted to the data receiving device RX through the channel may have ISI based on characteristics of the channel CH. In an implementation, the signal transmitted to the data receiving device RX may include noise due to ISI in addition to the data that the data transmitting device TX intends to transmit, that is, the unit symbol US.

The data receiving device RX may generate a reconstructed multi-level signal MSR in which the unit symbols US of the multi-level signal MS that the data transmitting device TX intends to transmit is reconstructed by removing the ISI from the signal transmitted from the data transmitting device TX.

The data receiving device RX may include a conditioning block 210, an analog-to-digital converter (ADC) 220, a feed forward equalizer (FFE) 230, a decision feedback equalizer (DFE) 240, and a calibration block 250. In some embodiments, the data receiving device RX may include further components.

The conditioning block 210 may perform analog conditioning on the signal received through the channel CH. The analog-to-digital converter (ADC) 220 may convert the conditioned analog signal into a digital signal.

The feed forward equalizer (FFE) 230 and the decision feedback equalizer (DFE) 240 may receive an output of the analog-to-digital converter 220 and may generate the reconstructed multi-level signal MSR in which the ISI generated in the channel CH has been removed. The calibration block 250 may perform a calibration operation necessary to generate the reconstructed multi-level signal MSR.

Figure 4:
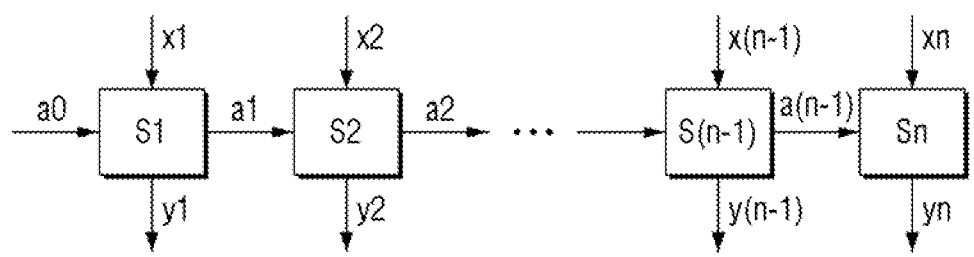
FIG. 4 is a circuit diagram illustrating an example embodiment of a normal stage block of FIG. 3.
Figure 5:
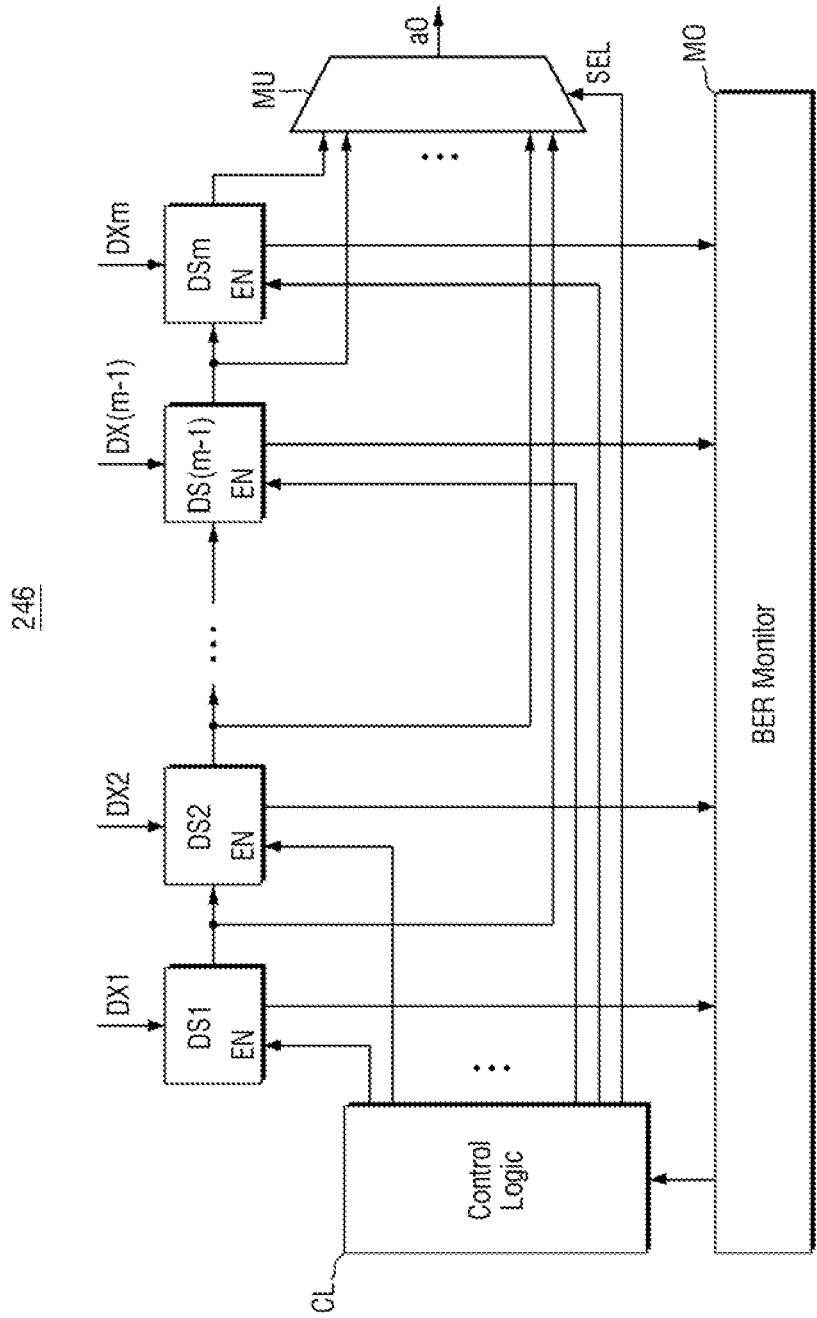
FIG. 5 is a circuit diagram illustrating an example embodiment of a dummy stage block of FIG. 3.

Hereinafter, with reference to FIG. 3 to FIG. 5, an example embodiment of the analog-to-digital converter (ADC) 220, the feed forward equalizer (FFE) 230 and the decision feedback equalizer (DFE) 240 will be described.

Figure 3:
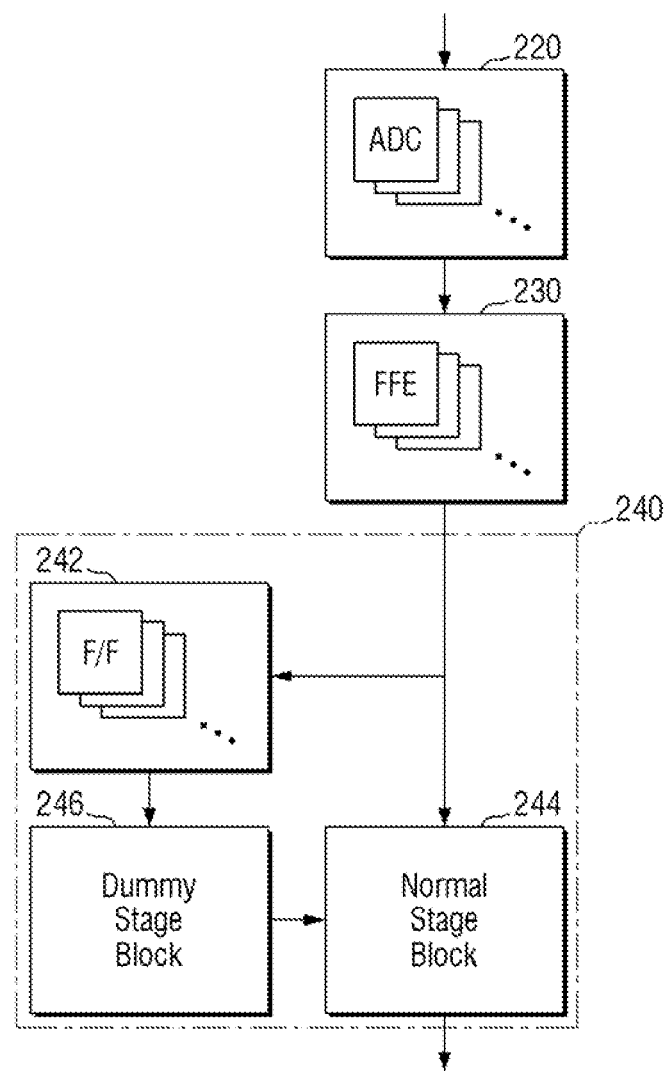
FIG. 3 is a detailed diagram illustrating an example embodiment of an analog-to-digital converter (ADC) 220, a feed forward equalizer (FFE) 230, and a decision feedback equalizer 240 of FIG. 1.

FIG. 3 is a detailed diagram showing an example embodiment of the ADC, the FFE, and the DFE of FIG. 1. FIG. 4 is a circuit diagram of a normal stage block shown in FIG. 3. FIG. 5 is a circuit diagram of a dummy stage block shown in FIG. 3.

Referring to FIG. 3, the analog-to-digital converter 220 may include a plurality of analog-to-digital converting circuits. The analog-to-digital converting circuits may respectively process portions into which the serial data received by the data receiving device RX is divided in a parallel manner. In an implementation, when the analog-to-digital converter 220 includes 32 analog-to-digital converting circuits and the data receiving device RX receives 32G bps (bit per second) of data, each of the 32 analog-to-digital converting circuits may process 1G bps of 32G bps (bit per second) of data such that the 32 analog-to-digital converting circuits may respectively process the 32G bps (bit per second) of data in a parallel manner. Alternatively, when the analog-to-digital converter 220 includes 64 analog-to-digital converting circuits and the data receiving device RX receives 64G bps (bit per second) of data, each of the 64 analog-to-digital converting circuits may process 1G bps of 64G bps (bit per second) of data such that the 64 analog-to-digital converting circuits may respectively process the 64G bps (bit per second) of data in a parallel manner.

The feed forward equalizer 230 may include a plurality of feed forward equalizer circuits. Each of the feed forward equalizer circuits may receive and process an output of each of the analog-to-digital converting circuits included in the analog-to-digital converter 220. In some embodiments, when the analog-to-digital converter 220 includes 32 analog-to-digital converting circuits, the feed forward equalizer 230 may include 32 feed forward equalizer circuits. However, embodiments are not limited thereto.

The decision feedback equalizer 240 may include a flip flop circuit 242, a normal stage block 244, and a dummy stage block 246. The flip flop circuit 242 may output an output of the feed forward equalizer 230 in a delayed manner. In order to vary a delay amount of the output of the feed forward equalizer 230, the flip flop circuit 242 may include a plurality of flip flops.

The normal stage block 244 may receive the output of the feed forward equalizer 230 and may remove the ISI as described above from the output of the feed forward equalizer 230 to generate an output signal and may output the generated output signal.

Hereinafter, an example embodiment of the normal stage block 244 will be described in more detail with reference to FIG. 4. Referring to FIG. 4, the normal stage block 244 may include n (n is a natural number greater than or equal to 2) normal stages S1 to Sn. In some embodiments, n may be equal to each of the number of the analog-to-digital converting circuits included in the analog-to-digital converter (220 in FIG. 3) as described above and the number of the feed forward equalizer circuits included in the feed forward equalizer (230 in FIG. 3) as described above. However, embodiments are not limited thereto.

The normal stage S1 may receive an input signal x1 from a corresponding feed forward equalizer circuit of the feed forward equalizer (230 of FIG. 3). Then, the normal stage S1 may receive coefficient information a0 required to remove the ISI from the received input signal x1 from the dummy stage block (246 in FIG. 3).

The coefficient information a0 may include the number of coefficient values based on a tap configuration of the normal stage S1. In some embodiments, the plurality of normal stages S1 to Sn may have the same tap configuration.

In an implementation, when the normal stage S1 has a 1-tap configuration, the normal stage S1 may remove ISI by a signal before 1 unit interval (e.g., UI in FIG. 2) from the received input signal x1 and may output an output signal y1 free of the ISI. In this regard, the coefficient information a0 may include one coefficient value that supports the above operation.

In an implementation, when the normal stage S1 has a 2-tap configuration, the normal stage S1 may remove ISI by a signal before 1 unit interval and ISI by a signal before 2 unit intervals from the received input signal x1 and may output an output signal y1 free of the ISI. In this regard, the coefficient information a0 may include two coefficient values that support the above operation.

In an implementation, when the normal stage S1 has a 3-tap configuration, the normal stage S1 may remove ISI by signal before 1 unit interval, ISI by a signal before 2 unit intervals, and ISI by a signal before 3 unit intervals from the received input signal x1, and may output an output signal y1 free of the ISI. In this regard, the coefficient information a0 may include three coefficient values that support the above operation.

The normal stage S1 may generate coefficient information a1 based on the output signal y1 and output the generated coefficient information a1 to a normal stage S2. In an implementation, when the normal stage S1 has a 2-tap configuration, the coefficient information a0 may include two coefficient values. One coefficient value among the two coefficient values may not be updated and be transmitted to the normal stage S2, while the other coefficient value among the two coefficient values may be updated based on the output signal y1 and then may be transmitted to the normal stage S2. However, embodiments are not limited thereto.

The normal stage S2 may receive an input signal x2 from a corresponding feed forward equalizer circuit of the feed forward equalizer (230 of FIG. 3). Further, the normal stage S2 may receive the coefficient information a1 required to remove ISI from the input signal x2 from the normal stage S1.

The normal stage S2 may remove ISI from the input signal x2 using the coefficient information a1, and may output an output signal y2 free of the ISI. Then, the normal stage S2 may generate coefficient information a2 based on the output signal y2 and output the generated coefficient information a2 to a subsequent normal stage.

The n normal stages S1 to Sn may sequentially operate in the above manner. In this embodiment, a last normal stage Sn among the n normal stages S1 to Sn does not generate coefficient information based on an output signal yn. Accordingly, the normal stage Sn does not feedback the coefficient information to the normal stage S1. Rather, in this embodiment, the normal stage S1 receives the coefficient information a0 necessary for the removal of ISI from the dummy stage block (246 in FIG. 3).

Referring back to FIG. 3, the dummy stage block 246 may receive an output of the flip flop circuit 242, and may generate the coefficient information (a0 of FIG. 4) based on the received output, and output the generated coefficient information to the normal stage block 244.

Hereinafter, an example embodiment of the dummy stage block 246 will be described in more detail with reference to FIG. 5. Referring to FIG. 5, the dummy stage block 246 may include m dummy stages DS1 to DSm (m is a natural number equal to or greater than 2), a Bit Error Rate (BER) monitor MO, a control logic CL, and a multiplexer MU.

In some embodiments, m as the number of the dummy stages may be equal to n as the number of the normal stages as described above. However, embodiments are not limited thereto, and m may be designed to be different from n as needed.

The m dummy stages DS1 to DSm may respectively receive input signals DX1 to DXm from the flip flop circuit (242 in FIG. 3). Since the input signals DX1 to DXm are respectively provided to the m dummy stages DS1 to DSm via the flip flop circuit (242 in FIG. 3), the input signals DX1 to DXm may be delayed, compared to the input signals (x1 to xn in FIG. 4) as respectively received by the normal stages (S1 to Sn in FIG. 4). A configuration and an operation of the dummy stages DS1 to DSm are the same as those of the normal stages (S1 to Sn in FIG. 4) except that the input signals DX1 to DXm respectively received by the m dummy stages DS1 to DSm are delayed, compared to the input signals (x1 to xn in FIG. 4) as respectively received by the normal stages (S1 to Sn in FIG. 4).

In an implementation, the dummy stage DS1 may remove ISI from the received input signal DX1 using the coefficient information, and may output an output signal in which the ISI has been removed. Further, the dummy stage DS1 may update the coefficient information based on the output signal and output the updated coefficient information to the dummy stage DS2.

In some embodiments, the dummy stage DS1 may use a predetermined initial value as the coefficient information. The coefficient information may include the number of coefficient values based on a tap configuration of the dummy stage DS1. The plurality of dummy stages DS1 to DSm may have the same tap configuration as that of the plurality of normal stages S1 to Sn.

The dummy stage DS2 may remove ISI from the received input signal DX2 using the coefficient information provided from the dummy stage DS1, and may output an output signal in which the ISI has been removed. The dummy stage DS2 may update the coefficient information based on the output signal thereof and output the updated coefficient information to a subsequent dummy stage.

The m dummy stages DS1 to DSm may sequentially operate in the above manner. The BER monitor MO may receive the output signals from the m dummy stages DS1 to DSm and may calculate BER ( ). Then, the BER monitor MO may provide the calculation result to the control logic CL.

The control logic CL may control whether to enable or disable the m dummy stages DS1 to DSm based on the calculation result of the BER monitor MO. In an implementation, the control logic CL may enable the number of dummy stages necessary to satisfy a target BER and disable the remaining dummy stages, based on the calculation result of the BER monitor MO.

The multiplexer MU may receive the coefficient information respectively output from the m dummy stages DS1 to DSm. Then, the multiplexer MU may select one of the coefficient information respectively output from the m dummy stages DS1 to DSm based on a select signal SEL and may output the selected one. The coefficient information a0 output from the multiplexer MU may be provided to the normal stage (S1 in FIG. 4) as described above.

In some embodiments, the control logic CL may generate the select signal SEL and provide the generated select signal to the multiplexer MU. In an implementation, the control logic CL generates the select signal SEL based on the calculation result of the BER monitor MO, and may provide the generated select signal to the multiplexer MU. However, an embodiment is not limited thereto, and the select signal SEL may be generated by a component other than the control logic CL.

Hereinafter, an operation of the data receiving device according to example embodiments will be described with reference to FIG. 6 to FIG. 9. FIG. 6 to FIG. 9 are diagrams for illustrating example embodiments of the operation of the data receiving device.

Figure 6:
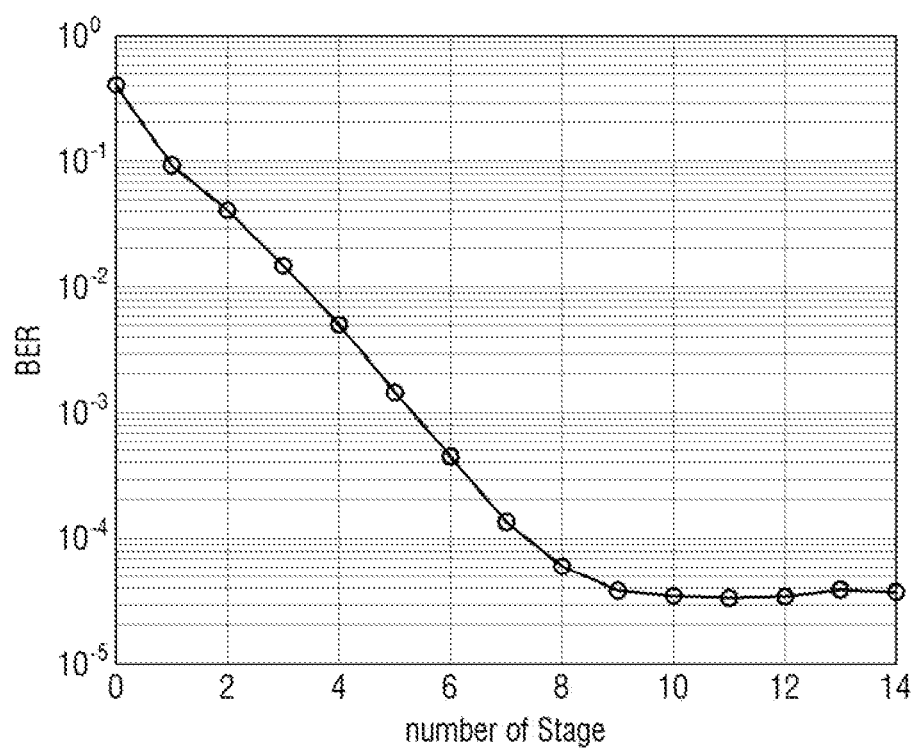
FIGS. 6-9 are diagrams for illustrating example embodiments of an operation of a data receiving device according to some embodiments.
Figure 7:
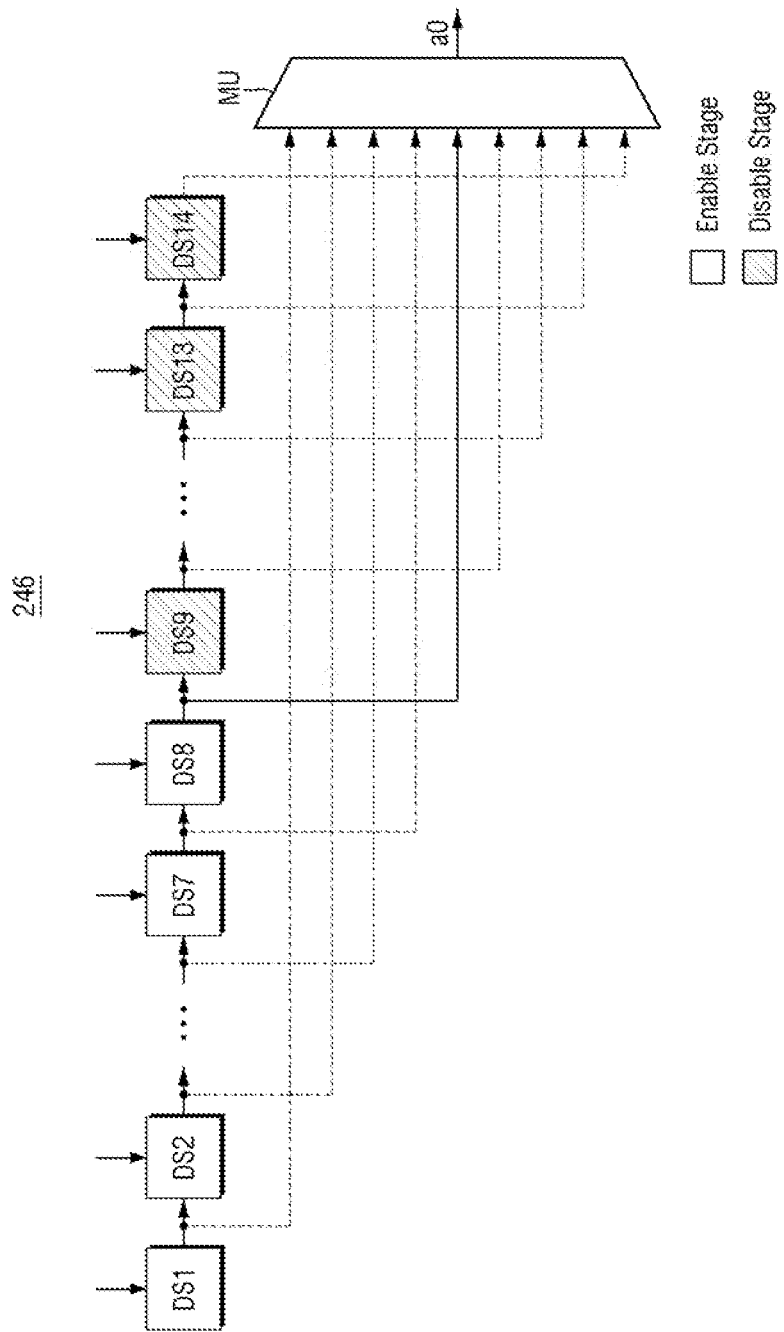

FIG. 6 is a graph showing BER measured by the BER monitor (MO in FIG. 5) using the output signals of the m dummy stages DS1 to DSm when performance of the feed forward equalizer (230 in FIG. 3) is poor. Referring to FIG. 6, when the target BER is $10^{-4}$, it is necessary to use 8 dummy stages to obtain a desired quality signal. Accordingly, as shown in FIG. 7, the control logic CL may enable 8 dummy stages out of a total of 14 dummy stages and disable 6 dummy stages thereof. Then, the multiplexer MU may select the coefficient information output from the dummy stage DS8 based on the select signal and provide the selected coefficient information as the coefficient information a0 to the normal stage (S1 in FIG. 4).

Figure 8:
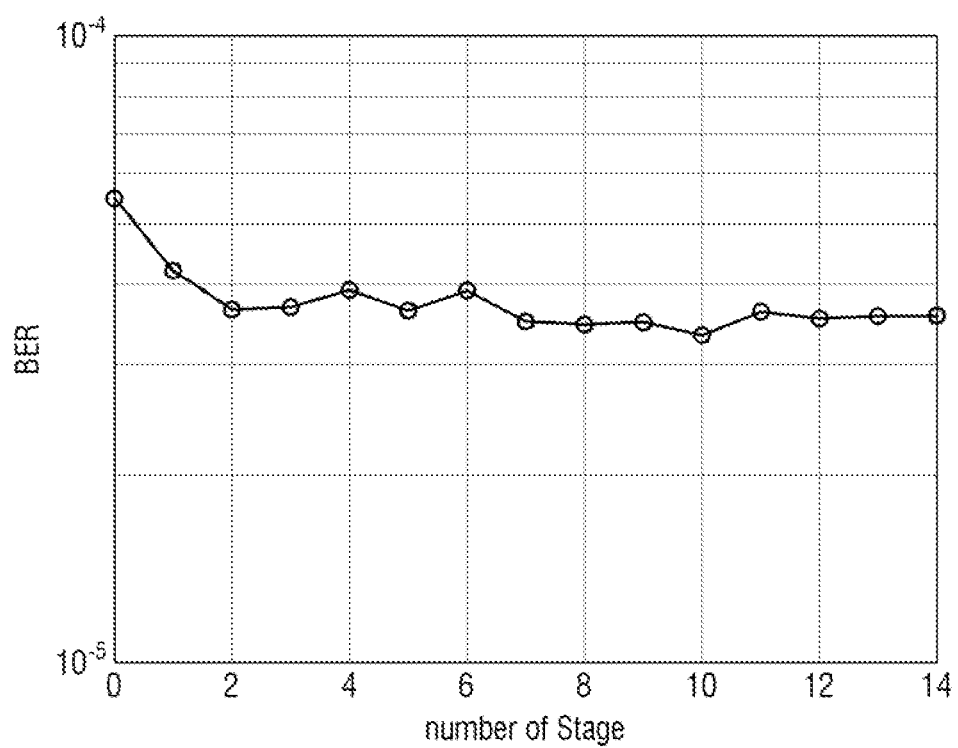

Next, FIG. 8 is a graph showing the BER measured by the BER monitor (MO in FIG. 5) using the output signals of the m dummy stages DS1 to DSm when the feed forward equalizer (230 of FIG. 3) has good performance.

Figure 9:
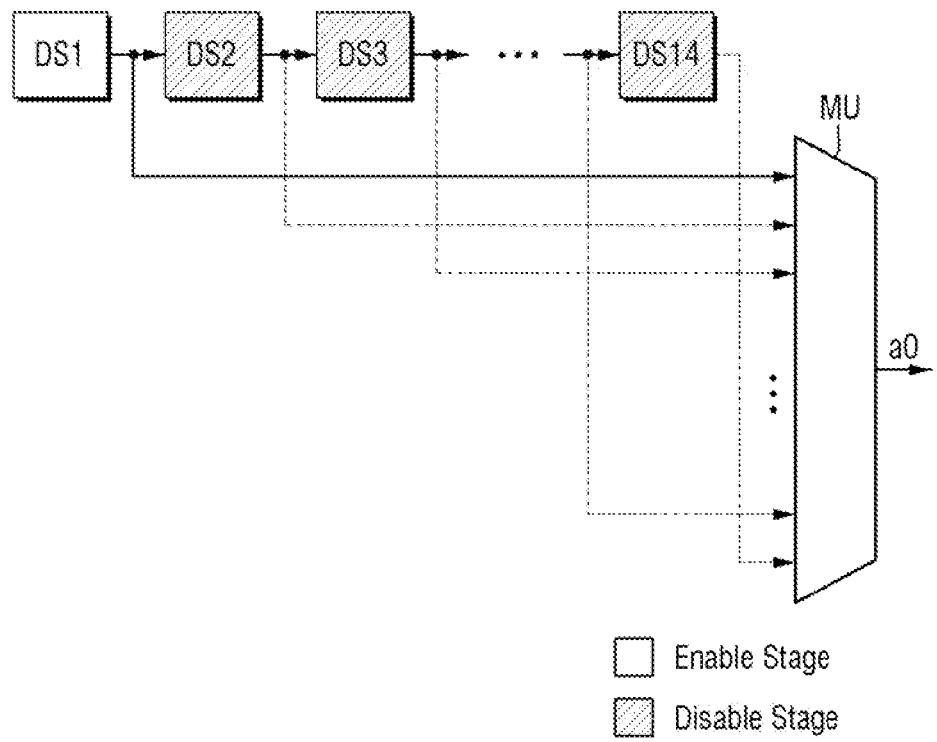

Referring to FIG. 8, when the target BER is $10^{-4}$, a signal of desired quality may be obtained even using only one dummy stage. Accordingly, the control logic CL may enable one dummy stage out of a total of 14 dummy stages and disable 13 dummy stages thereof as shown in FIG. 9. Then, the multiplexer MU may select the coefficient information output from the dummy stage DS1 based on the select signal and provide the selected coefficient information as the coefficient information a0 to the normal stage (S1 in FIG. 4).

Figure 10:
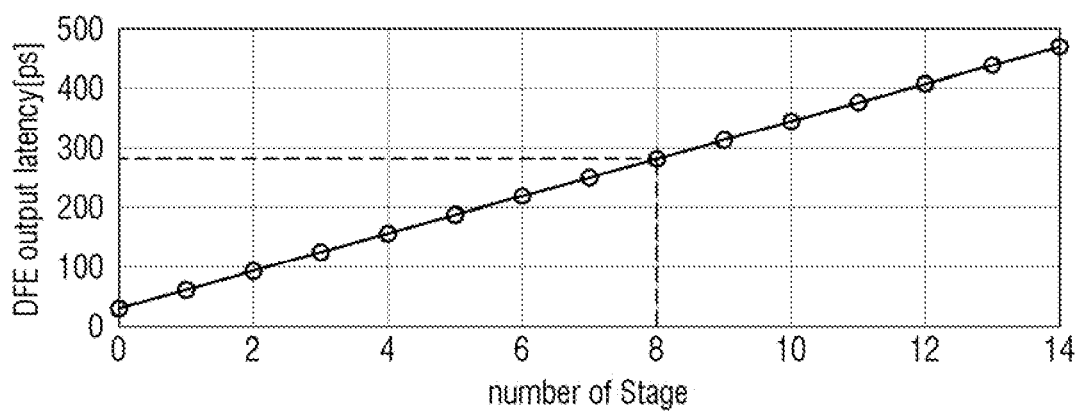
FIG. 10 and FIG. 11 are diagrams for illustrating an effect of a data receiving device according to example embodiments.
Figure 11:
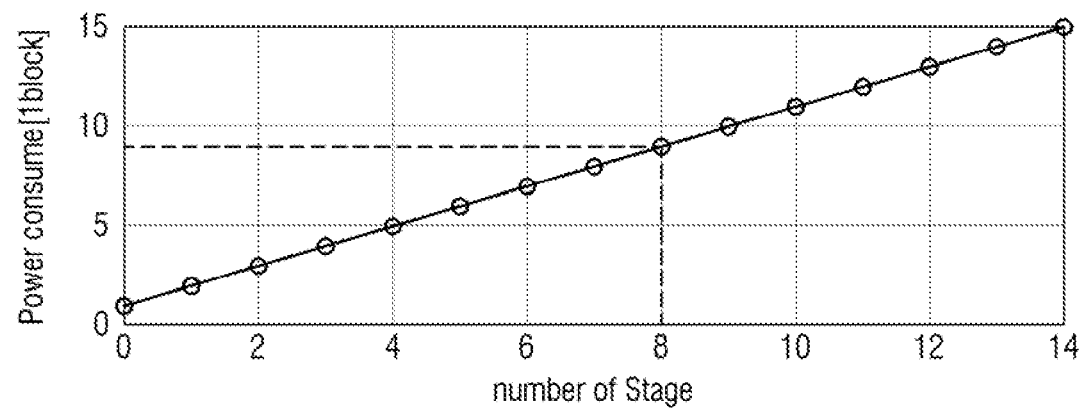

FIG. 10 and FIG. 11 are diagrams for illustrating example embodiments of an effect of the data receiving device according to some embodiments. FIG. 10 is a graph showing latency of the decision feedback equalizer based on the number of dummy stages as used. Referring to FIG. 10, it may be identified that as a larger number of the dummy stages are used, a time amount (clocks) required to generate the coefficient information is increased, such that the latency increases.

In this embodiment, only the number of dummy stages that should be enabled so as to satisfy the target BER may be determined based on the calculation result of the BER monitor (MO in FIG. 5), and then may be enabled and used, so that the latency of the decision feedback equalizer may be reduced. In an implementation, it may be identified that when the coefficient information is generated using only the 8 dummy stages as in the example as described above, the latency may be reduced by about 40%.

FIG. 11 is a graph showing power consumption of the DFE based on the number of the dummy stages as used. Referring to FIG. 11, it may be identified that as a larger number of the dummy stages are used, the power consumption increases. In this embodiment, only the number of dummy stages that should be enabled so as to satisfy the target BER may be determined based on the calculation result of the BER monitor (MO in FIG. 5), and then may be enabled and used, so that the power consumption of the DFE may be reduced. In an implementation, it may be identified that when the coefficient information is generated using only 8 dummy stages as in the example as described above, the power consumption may be reduced by about 40%. In an implementation, the power consumption of the data receiving device according to the present embodiment may be reduced while the operation performance thereof may be improved.

Figure 12:
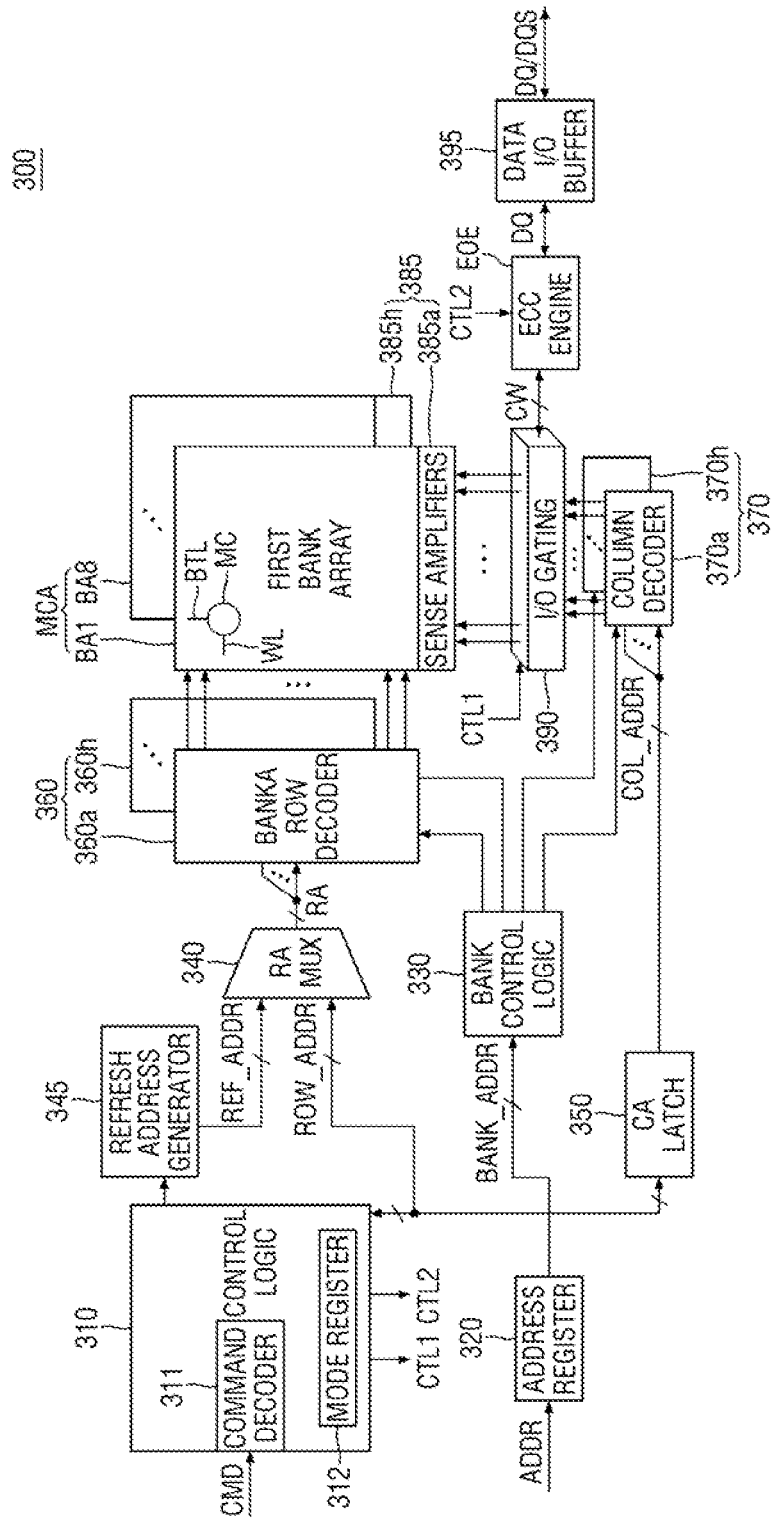
FIG. 12 is a block diagram illustrating a memory device including a data receiving device according to example embodiments.

FIG. 12 is a block diagram of a memory device including a data receiving device according to example embodiments. Referring to FIG. 12, a memory device 300 may include a control logic 310, an address register 320, a bank control logic 330, a row address multiplexer 340, a refresh address generator 345, a column address latch 350, a row decoder 360, a column decoder 370, a sense amplifier 385, an input/output gating circuit 390, a memory cell array MCA, an ECC engine EOE, and a data input/output buffer 395.

The memory cell array MCA may include a plurality of memory cells MC for storing data therein. In an implementation, the memory cell array MCA may include first to eighth bank arrays BA1 to BA8. Each of the first to eighth bank arrays BA1 to BA8 may include a plurality of word-lines WL, a plurality of bit-lines BTL, and a plurality of memory cells MC respectively in intersections of the word-lines WL and the bit-lines BTL.

The memory cell array MCA may include the first to eighth bank arrays BA1 to BA8. Although FIG. 12 illustrates the memory device 300 including the eight bank arrays BA1 to BAB, embodiments are not limited thereto, and the memory device 300 may include any number of bank arrays.

The control logic 310 may control an operation of the memory device 300. In an implementation, the control logic 310 may generate control signals CTL1 and CTL2 so that the memory device 300 performs an operation for writing data or an operation for reading data. The control logic 310 may include a command decoder 311 for decoding a command CMD received from an external host device, and a mode register 312 for setting an operation mode of the memory device 300.

In an implementation, the command decoder 311 may decode a write enable signal, a row address strobe signal, a column address strobe signal, a chip select signal, etc. to generate control signals corresponding to the command CMD. The control logic 310 may receive a clock signal and a clock enable signal for driving the memory device 300 in a synchronous manner. Further, the control logic 310 may control the refresh address generator 345 to generate a refresh row address REF_ADDR in response to a refresh command.

The address register 320 may receive an address ADDR from the external host device. In an implementation, the address register 320 may receive the address ADDR including a bank address BANK_ADDR, a row address ROW_ADDR, and a column address COL_ADDR. The address register 320 may provide the received bank address BANK_ADDR to the bank control logic 330, may provide the received row address ROW_ADDR to the row address multiplexer 340, and may provide the received column address COL_ADDR to the column address latch 350.

The bank control logic 330 may generate bank control signals in response to the bank address BANK_ADDR received from the address register 320. In response to these bank control signals, a bank row decoder corresponding to the bank address BANK_ADDR among the first to eighth bank row decoders 360a to 360h may be activated, and a bank column decoder corresponding to the bank address BANK_ADDR among the first to eighth bank column decoders 370a to 370h may be activated.

The row address multiplexer 340 may receive the row address ROW_ADDR from the address register 320, and may receive the refresh row address REF_ADDR from the refresh address generator 345. The row address multiplexer 340 may selectively output the row address ROW_ADDR received from the address register 320 or the refresh row address REF_ADDR received from the refresh address generator 345 as a row address RA. The row address RA output from the row address multiplexer 340 may be applied to each of the first to eighth bank row decoders 360a to 360h.

The refresh address generator 345 may generate the refresh row address REF_ADDR to refresh the memory cells. The refresh address generator 345 may provide the refresh row address REF_ADDR to the row address multiplexer 340. Accordingly, memory cells in a word-line corresponding to the refresh row address REF_ADDR may be refreshed.

The column address latch 350 may receive the column address COL_ADDR from the address register 320, and may temporarily store therein the received column address COL_ADDR. Further, the column address latch 350 may incrementally increase the received column address COL_ADDR in a burst mode. The column address latch 350 may apply the temporarily-stored or incrementally-increased column address COL_ADDR to each of the first to eighth bank column decoders 370a to 370h.

The row decoder 360 may include first to eighth bank row decoders 360a to 360h respectively connected to the first to eighth bank arrays BA1 to BA8. The column decoder 370 may include first to eighth bank column decoders 370a to 370h respectively connected to the first to eighth bank arrays BA1 to BA8. The sense amplifier 385 may include first to eighth bank sense amplifiers 385a to 385h respectively connected to the first to eighth bank arrays BA1 to BA8.

The bank row decoder activated by the bank control logic 330 among the first to eighth bank row decoders 360a to 360h may decode the row address RA output from the row address multiplexer 340 to activate a word-line corresponding to the row address RA. In an implementation, the activated bank row decoder may apply a word-line driving voltage to a word-line corresponding to the row address RA.

The bank column decoder activated by the bank control logic 330 among the first to eighth bank column decoders 370a to 370h may activate the bank sense amplifiers 385a to 385h corresponding to the bank address BANK_ADDR and the column address COL_ADDR via the input/output gating circuit 390.

The input/output gating circuit 390 may include circuits for gating input/output data, an input data mask logic, read data latches for storing therein data output from the first to eighth bank arrays BA1 to BA8, and write drivers for writing data into the first to eighth bank arrays BA1 to BA8.

A codeword CW to be read from one bank array among the first to eighth bank arrays BA1 to BA8 may be sensed by the bank sense amplifiers 385a to 385h corresponding to said one bank array and may be stored in the read data latches.

The ECC engine EOE may perform ECC decoding on the codeword CW stored in the read data latches. When an error is detected in data of the codeword CW, the ECC engine EOE may provide a corrected data signal DQ to an external memory controller via the data input/output buffer 395.

A data signal DQ to be written to one bank array among the first to eighth bank arrays BA1 to BA8 may be provided to the ECC engine EOE. The ECC engine EOE may generate parity bits based on the data signal DQ, and may provide the data signal DQ and the parity bits to the input/output gating circuit 390. The input/output gating circuit 390 may write the data signal DQ and the parity bits to a sub-page of said one bank array via the write drivers.

The data input/output buffer 395 may receive the data signal DQ and a data strobe signal DQS from an external device (i.e., a host device). In some embodiments, the data input/output buffer 395 may include a first data input/output buffer (i.e., a data buffer) that receives the data signal DQ from the external device, and a second data input/output buffer (i.e., a data strobe buffer) that receives the data strobe signal DQS from the external device.

In a write operation, the data input/output buffer 395 may perform buffering or driving on the data signal DQ (i.e., write data) and may provide the data signal DQ to the ECC engine EOE. In a read operation, the data input/output buffer 395 may perform buffering or driving on the data signal DQ (i.e., read data) provided from the ECC engine EOE and may provide the data signal DQ to the external host device.

The data receiving device (RX in FIG. 1) as described above may be employed in the data input/output buffer 395.

Figure 13:
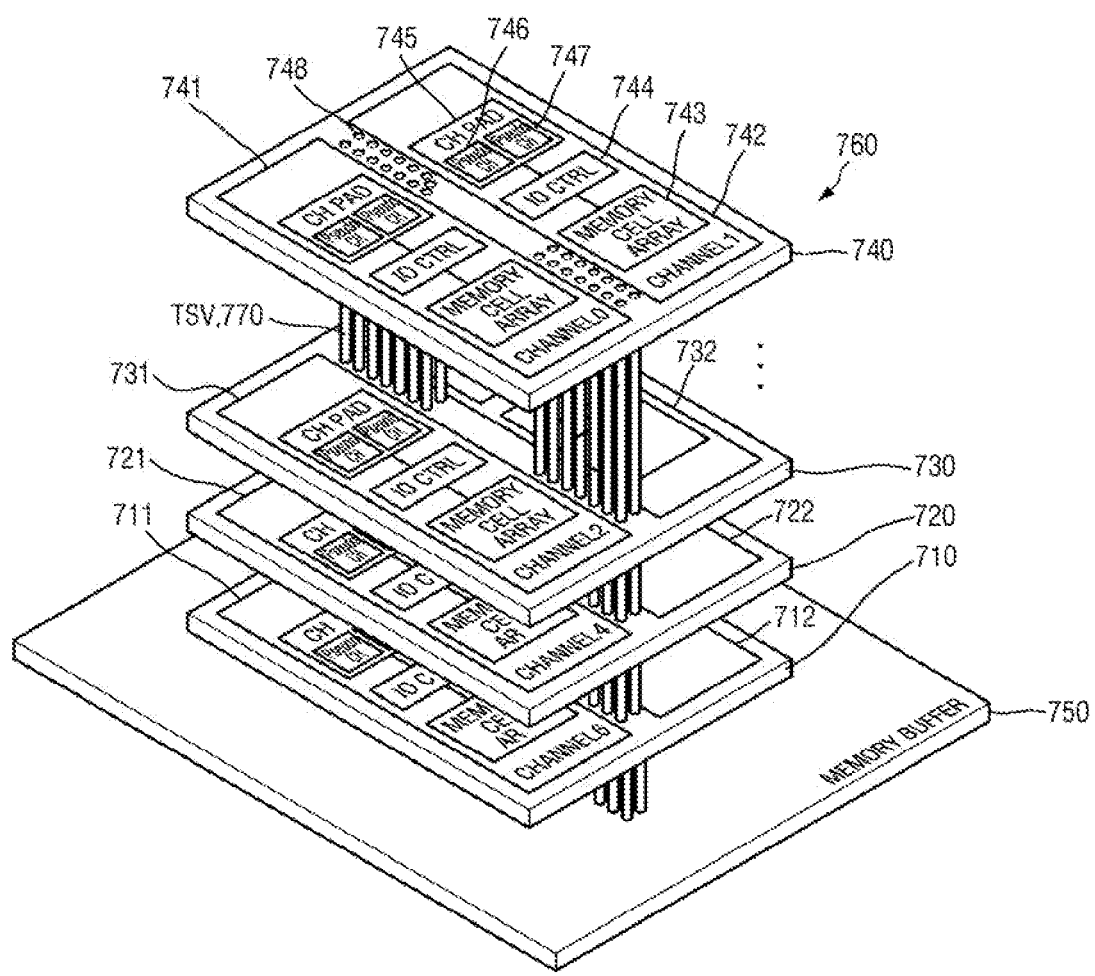
FIG. 13 is a diagram for illustrating a memory device including a data receiving device according to example embodiments.

FIG. 13 is a diagram for illustrating a memory device including a data receiving device according to example embodiments.

Referring to FIG. 13, a memory device 760 may include a stack of a plurality of memory layers 710, 720, 730, and 740. The memory device 760 may be embodied as, i.e., High Bandwidth Memory (HBM). The memory layers 710, 720, 730, and 740 may constitute a plurality of independent interfaces referred to as channels.

Each of the memory layers 710, 720, 730 and 740 may include two channels 711-712, 721-722, 731-732, or 741-742. FIG. 13 shows an example in which the memory device 760 includes a stack of the four memory layers 710, 720, 730, and 740 to constitute 8 channels. However, embodiments are not limited thereto. According to an embodiment, the memory device 760 may include a stack of 2 to 8 memory layers.

Each of the channels 711, 712, 721, 722, 731, 732, 741, and 742 may include a memory cell array 743 that operates independently on each channel basis, an input/output controller 744 for independently controlling the memory cell array 743 on each channel basis, and a channel pad 745 that provides a channel for the memory cell array 743.

The memory cell array 743 may include memory cells connected to a plurality of word-lines and a plurality of bit-lines. The memory cells may be grouped into a plurality of memory banks and/or memory blocks. In an area of the memory cell array 743, a row decoder, a column decoder, a sense amplifier, etc. for accessing the memory cells may be disposed.

The input/output controller 744 may include a RAS control logic, a CAS control logic, etc. The channel pad 745 may include pads arranged in a matrix manner including a plurality of rows and a plurality of columns. Each of the pads of the channel pad 745 may be connected to an electrode 748 and a through silicon via (TSV) 770 via a wiring for signal routing.

The memory device 760 may further include a memory buffer 750 under the stack of the memory layers 710, 720, 730, and 740. The memory buffer 750 may include an input buffer (or a receiver) that receives a command, an address, a clock and data from the control logic, and may buffer and provide the received command, address, clock and data to the channels 711, 712, 721, 722, 731, 732, 741, and 742.

The memory buffer 750 may include the data receiving device (RX in FIG. 1) as described above. The memory buffer 750 may perform a signal distribution function and a data input/output function on the channels 711, 712, 821, 722, 731, 732, 741, and 742 via the electrodes 748 and the through silicon vias 770.

The memory buffer 750 may communicate with the control logic through conducting means (i.e., bumps or solder balls) formed on an outer face of the memory device 760.

Each of the memory layers 710, 720, 730, and 740 may include two channels 711, 712, 721, 722, 731, 732, 741, and 742. A single channel may be composed of two pseudo-channels.

Assuming that the number of data input/output (DQ) pads included in an area of the channel pad 745 of each of the channels 711, 712, 721, 722, 731, 732, 741, and 742 is, i.e., 128, the 128 DQ pads of the channel pad 745 of each of the channels 711, 712, 721, 722, 731, 732, 741, and 742 may be divided into two groups of pseudo channels 746 and 747, and the number of DQ pads of each of the pseudo channels 746 and 747 may be 64. In this regard, each of the channels 711, 712, 721, 722, 731, 732, 741, and 742 may receive the data via eight DQ pads.

Figure 14:
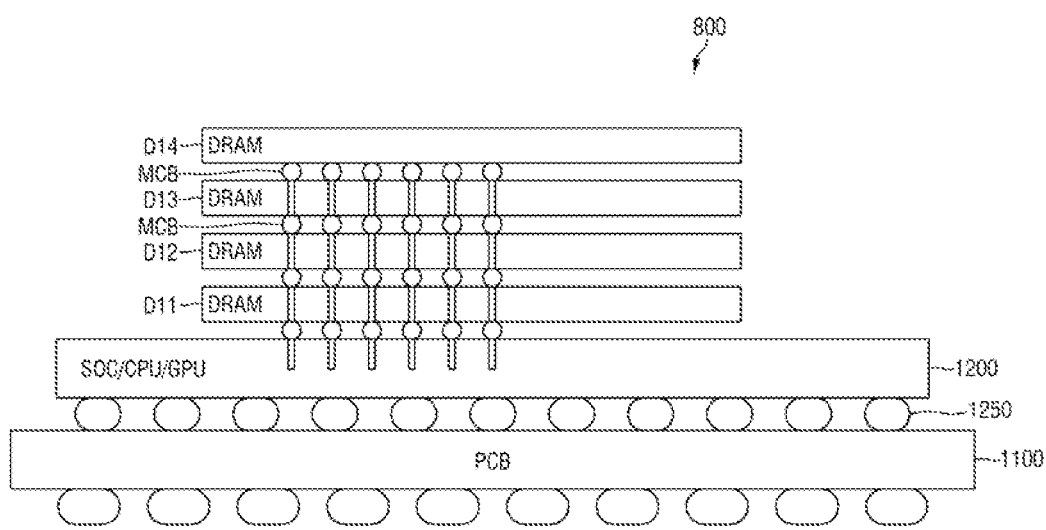
FIGS. 14 and 15 are diagrams illustrating an example embodiment in which a memory device is applied to a 3D chip structure.
Figure 15:
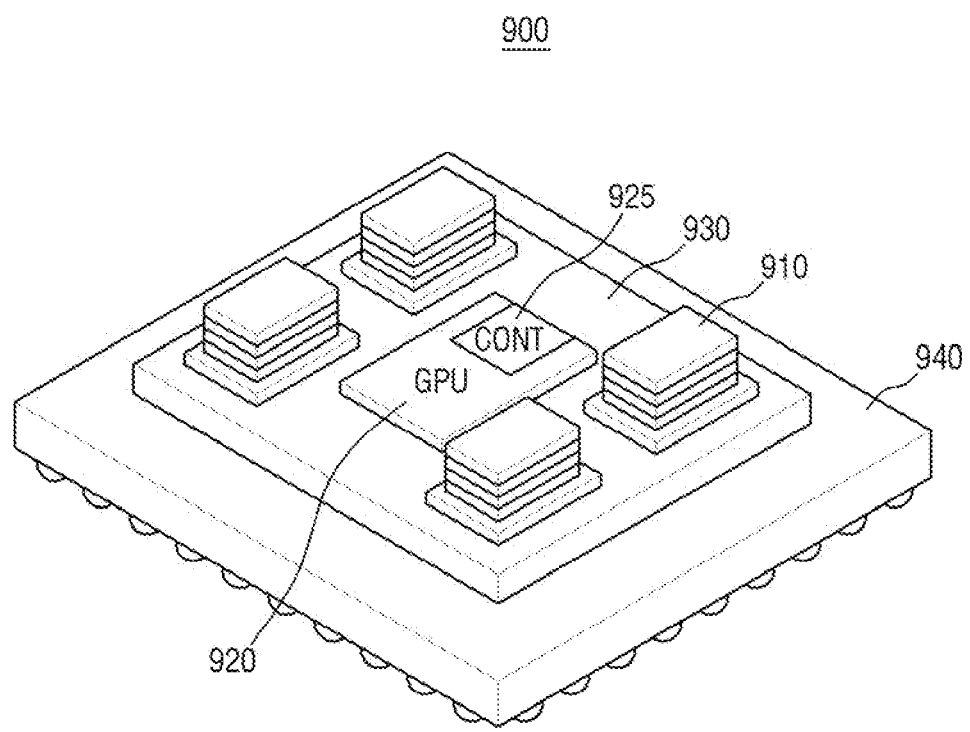

FIGS. 14 and 15 are diagrams illustrating an example embodiment in which a memory device is applied to a 3D chip structure. FIG. 14 shows a 3D chip structure 800 in which a host and the HBM are directly connected to each other without an interposer layer interposed therebetween. Referring to FIG. 14, a host die 1200 which may be embodied as a SoC, CPU, or GPU may be on a top face of a PCB 1100 via flip chip bumps 1250.

Memory dies D11 to D14 are stacked on a top face of the host die 1200 so as to constitute an HBM structure as described above with reference to FIG. 13.

In FIG. 14, a buffer die or a logic die corresponding to the memory buffer 750 in FIG. 13 is omitted. However, the present disclosure is not limited thereto. The buffer die or the logic die may be between the memory die D11 and the host die 1200.

To implement the HBM structure, TSV lines referred to as through silicon electrodes may be formed in the memory dies D11 to D14. The TSV lines may be electrically connected to micro bumps MCB formed between the memory dies.

FIG. 15 is a structural diagram showing an example of a semiconductor package including a stacked memory device according to example embodiments. Referring to FIG. 15, a semiconductor package 900 may include one or more stacked memory devices 910 and a graphics processor (GPU) 920. The graphics processor 920 may include a memory controller 925.

The stacked memory device 910 and the graphic processor 920 may be mounted on an interposer 930. The interposer 930 on which the stacked memory device 910 and the graphic processor 920 are mounted may be mounted on a package substrate 940.

The stacked memory device 910 may be implemented in various forms. In some embodiments, the stacked memory device 910 may be embodied as an HBM-type memory device in which a plurality of layers are stacked. Accordingly, the stacked memory device 910 may include a buffer die and a plurality of memory dies, and each of the plurality of memory dies may include a memory cell array and an error correction circuit.

A plurality of stacked memory devices 910 may be mounted on the interposer 930, and the graphic processor 920 may communicate with the plurality of stacked memory devices 910. In some embodiments, each of the stacked memory devices 910 and the graphic processor 920 may include a pie area, and communication between the stacked memory devices 910 and the graphic processor 920 may be performed via the pie area. In this pie area, the data transmitting device (TX in FIG. 1) and the data receiving device (RX in FIG. 1) as described above may be disposed.

By way of summation and review, a technical purpose to be achieved by the present disclosure is to provide a data receiving device with reduced power consumption and improved performance.

Although embodiments have been described with reference to the accompanying drawings, the present disclosure is not limited to the above embodiments, but may be implemented in various different forms. A person skilled in the art may appreciate that the present disclosure may be practiced in other concrete forms without changing the technical spirit or essential characteristics. Therefore, it should be appreciated that the embodiments as described above is not restrictive but illustrative in all respects.

In the figures, the dimensions of layers and regions may be exaggerated for clarify of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A data receiving device comprising:
a dummy stage block including m dummy stages, wherein m is a natural number greater than or equal to two, and wherein each of the m dummy stages is configured to remove inter-symbol interference from a dummy input signal using dummy coefficient information to generate a dummy output signal free of the inter-symbol interference and wherein each of the m dummy stages is further configured to output the dummy output signal; and
a normal stage block including n normal stages, wherein n is a natural number greater than or equal to two, and wherein each of the n normal stages is configured to remove inter-symbol interference from an input signal using coefficient information to generate an output signal free of the inter-symbol interference and is further configured to output the output signal,
wherein one of the n normal stages is further configured to receive the coefficient information from the dummy stage block, and
wherein the dummy stage block is further configured to enable some of the m dummy stages and disable the remaining dummy stages, based on the dummy output signal.

2. The data receiving device as claimed in claim 1, wherein the dummy stage block further includes:
a bit error rate monitor configured to calculate a bit error rate of the dummy output signal; and
a control logic configured to determine whether to enable or disable the m dummy stages, based on a calculation result of the bit error rate monitor.

3. The data receiving device as claimed in claim 2, wherein the dummy stage block further includes a multiplexer configured to:
receive dummy coefficient information respectively from the m dummy stages;
select one of the dummy coefficient information respectively received from the m dummy stages, based on a select signal provided from the control logic; and
output the selected dummy coefficient information.

4. The data receiving device as claimed in claim 1, wherein the m dummy stages include a first dummy stage and a second dummy stage,
wherein the first dummy stage is configured to:
receive a first dummy input signal;
remove inter-symbol interference from the first dummy input signal using first dummy coefficient information to generate a first dummy output signal free of the inter-symbol interference, and output the first dummy output signal; and
generate second dummy coefficient information based on the first dummy output signal, and output the second dummy coefficient information, and
wherein the second dummy stage is configured to:
receive a second dummy input signal;
receive the second dummy coefficient information from the first dummy stage;
remove inter-symbol interference from the second dummy input signal using the second dummy coefficient information to generate a second dummy output signal free of the inter-symbol interference, and output the second dummy output signal; and
generate third dummy coefficient information based on the second dummy output signal, and output the third dummy coefficient information.

5. The data receiving device as claimed in claim 4, wherein the m dummy stages further include a third dummy stage, and
wherein the third dummy stage is configured to:
receive a third dummy input signal;
receive the third dummy coefficient information from the second dummy stage;
remove inter-symbol interference from the third dummy input signal using the third dummy coefficient information to generate a third dummy output signal free of the inter-symbol interference, and output the third dummy output signal; and
generate fourth dummy coefficient information based on the third dummy output signal, and output the fourth dummy coefficient information.

6. The data receiving device as claimed in claim 4, wherein the data receiving device further includes:
first and second analog-to-digital converters;
a first feed forward equalizer configured to receive an output of the first analog-to-digital converter;
a second feed forward equalizer configured to receive an output of the second analog-to-digital converter; and
a flip flop circuit configured to delay and output an output of each of the first and second feed forward equalizers,
wherein the first and second dummy input signals are output from the flip flop circuit.

7. The data receiving device as claimed in claim 1, wherein the n normal stages include a first normal stage and a second normal stage,
wherein the first normal stage is configured to:
receive a first input signal;
receive first coefficient information from the dummy stage block;
remove inter-symbol interference from the first input signal using the first coefficient information to generate a first output signal free of the inter-symbol interference and output the first output signal; and
generate second coefficient information based on the first output signal, and output the second coefficient information, and
wherein the second normal stage is configured to:
receive a second input signal;
receive the second coefficient information from the first normal stage;
remove inter-symbol interference from the second input signal using the second coefficient information to generate a second output signal free of the inter-symbol interference and output the second output signal; and
generate third coefficient information based on the second output signal and output the third coefficient information.

8. The data receiving device as claimed in claim 7, wherein the n normal stages further include a third normal stage, and
wherein the third normal stage is configured to:
receive a third input signal;
receive the third coefficient information from the second normal stage;
remove inter-symbol interference from the third input signal using the third coefficient information to generate a third output signal free of the inter-symbol interference and output the third output signal; and
generate fourth coefficient information based on the third output signal and output the fourth coefficient information.

9. The data receiving device as claimed in claim 7, wherein the data receiving device further includes:
first and second analog-to-digital converters;
a first feed forward equalizer configured to receive an output of the first analog-to-digital converter; and
a second feed forward equalizer configured to receive an output of the second analog-to-digital converter, and
wherein the first input signal is output from the first feed forward equalizer, and the second input signal is output from the second feed forward equalizer.

10. A data receiving device comprising:
a first dummy stage configured to:
receive a first dummy input signal;
remove inter-symbol interference from the first dummy input signal using first dummy coefficient information to generate a first dummy output signal free of the inter-symbol interference, and output the first dummy output signal; and
generate second dummy coefficient information based on the first dummy output signal, and output the second dummy coefficient information;
a second dummy stage configured to:
receive a second dummy input signal;
receive the second dummy coefficient information from the first dummy stage;
remove inter-symbol interference from the second dummy input signal using the second dummy coefficient information to generate a second dummy output signal free of the inter-symbol interference, and output the second dummy output signal; and
generate third dummy coefficient information based on the second dummy output signal, and output the third dummy coefficient information;
a multiplexer configured to:
select one of the second dummy coefficient information and the third dummy coefficient information, based on a select signal, and
output the selected one of the second dummy coefficient information and the third dummy coefficient information;
a first normal stage configured to:
receive a first input signal;
receive first coefficient information from the multiplexer;
remove inter-symbol interference from the first input signal using the first coefficient information to generate a first output signal free of the inter-symbol interference and output the first output signal; and
generate second coefficient information based on the first output signal, and output the second coefficient information; and
a second normal stage configured to:
receive a second input signal;
receive the second coefficient information from the first normal stage;
remove inter-symbol interference from the second input signal using the second coefficient information to generate a second output signal free of the inter-symbol interference and output the second output signal; and
generate third coefficient information based on the second output signal and output the third coefficient information.

11. The data receiving device as claimed in claim 10, wherein the select signal is determined based on the first and second dummy output signals.

12. The data receiving device as claimed in claim 11, wherein the select signal is determined based on a bit error rate of each of the first and second dummy output signals.

13. The data receiving device as claimed in claim 10, wherein the data receiving device further includes a control logic configured to determine whether to enable the first dummy stage and the second dummy stage, based on the first and second dummy output signals.

14. The data receiving device as claimed in claim 13, wherein the control logic is further configured to determine whether to enable the first dummy stage and the second dummy stage based on a bit error rate of each of the first and second dummy output signals.

15. The data receiving device as claimed in claim 10, wherein the data receiving device further includes:
first and second analog-to-digital converters;
a first feed forward equalizer configured to receive an output of the first analog-to-digital converter;
a second feed forward equalizer configured to receive an output of the second analog-to-digital converter; and
a flip flop circuit configured to delay and output an output of each of the first and second feed forward equalizers,
wherein the first and second dummy input signals are output from the flip flop circuit,
wherein the first input signal is output from the first feed forward equalizer, and
wherein the second input signal is output from the second feed forward equalizer.

16. The data receiving device as claimed in claim 10, wherein the data receiving device further includes:
a third dummy stage configured to:
receive a third dummy input signal;
receive the third dummy coefficient information from the second dummy stage;
remove inter-symbol interference from the third dummy input signal using the third dummy coefficient information to generate a third dummy output signal free of the inter-symbol interference, and output the third dummy output signal; and
generate fourth dummy coefficient information based on the third dummy output signal, and output the fourth dummy coefficient information; and
a third normal stage configured to:
receive a third input signal;
receive the third coefficient information from the second normal stage;
remove inter-symbol interference from the third input signal using the third coefficient information to generate a third output signal free of the inter-symbol interference and output the third output signal; and
generate fourth coefficient information based on the third output signal and output the fourth coefficient information,
wherein the multiplexer is configured to select one of the second to fourth dummy coefficient information based on the select signal and to output the selected one of the second to fourth dummy coefficient information.

17. A data receiving device comprising:
a first dummy stage configured to:
receive a first dummy input signal;

remove inter-symbol interference from the first dummy input signal using first dummy coefficient information to generate a first dummy output signal free of the inter-symbol interference, and output the first dummy output signal; and generate second dummy coefficient information based on the first dummy output signal, and output the second dummy coefficient information;

a second dummy stage configured to:

receive a second dummy input signal;

receive the second dummy coefficient information from the first dummy stage;

remove inter-symbol interference from the second dummy input signal using the second dummy coefficient information to generate a second dummy output signal free of the inter-symbol interference, and output the second dummy output signal; and generate third dummy coefficient information based on the second dummy output signal, and output the third dummy coefficient information;

a first normal stage configured to:

receive a first input signal;

receive the second dummy coefficient information from the first dummy stage;

remove inter-symbol interference from the first input signal using the second dummy coefficient information to generate a first output signal free of the inter-symbol interference and output the first output signal; and generate first coefficient information based on the first output signal, and output the first coefficient information; and a second normal stage configured to:

receive a second input signal;

receive the first coefficient information from the first normal stage;

remove inter-symbol interference from the second input signal using the first coefficient information to generate a second output signal free of the inter-symbol interference and output the second output signal; and generate second coefficient information based on the second output signal and output the second coefficient information.

18. The data receiving device as claimed in claim 17, wherein the data receiving device further includes:

a bit error rate monitor configured to calculate a bit error rate of each of the first and second dummy output signals; and a control logic configured to enable the first dummy stage and disable the second dummy stage, based on a calculation result of the bit error rate monitor.

19. The data receiving device as claimed in claim 17, wherein the data receiving device further includes:

a multiplexer configured to select one of the second dummy coefficient information and the third dummy coefficient information, based on a select signal and to output the selected one;

a bit error rate monitor configured to calculate a bit error rate of each of the first and second dummy output signals; and a control logic configured to output the select signal to control the multiplexer to select the second dummy coefficient information, based on a calculation result of the bit error rate monitor.

20. The data receiving device as claimed in claim 17, wherein the data receiving device further includes:

first and second analog-to-digital converters;

a first feed forward equalizer configured to receive an output of the first analog-to-digital converter;

a second feed forward equalizer configured to receive an output of the second analog-to-digital converter; and a flip flop circuit configured to delay and output an output of each of the first and second feed forward equalizers, wherein the first and second dummy input signals are output from the flip flop circuit, wherein the first input signal is output from the first feed forward equalizer, and wherein the second input signal is output from the second feed forward equalizer.

* * * * *